United States Patent
Lee et al.

(10) Patent No.: US 8,432,111 B2
(45) Date of Patent: Apr. 30, 2013

(54) PULSE AMPLITUDE MODULATION METHOD FOR THE DC BRUSHLESS MOTOR

(75) Inventors: Teng-Hui Lee, Sanchong (TW); Chan-Chih Liu, Sanchong (TW)

(73) Assignee: Amtek Semiconductor Co., Ltd., Taipei County (TW)

( * ) Notice: Subject to any disclaimer, the term of this patent is extended or adjusted under 35 U.S.C. 154(b) by 307 days.

(21) Appl. No.: 12/969,850

(22) Filed: Dec. 16, 2010

(65) Prior Publication Data

US 2012/0043919 A1  Feb. 23, 2012

(30) Foreign Application Priority Data

Aug. 17, 2010  (TW) ................... 99127409 A

(51) Int. Cl.
*H02P 6/00*  (2006.01)
(52) U.S. Cl.
USPC ............ 318/400.01; 318/400.06; 318/400.32; 318/400.34; 318/599
(58) Field of Classification Search ........... 318/700, 318/400.01, 400.06, 400.11, 400.17, 400.22, 318/400.26, 400.32, 400.34, 599, 600, 601
See application file for complete search history.

(56) References Cited

U.S. PATENT DOCUMENTS

| | | | | |
|---|---|---|---|---|
| 4,114,073 A | * | 9/1978 | Uzuka | 318/400.11 |
| 4,135,120 A | * | 1/1979 | Hoshimi et al. | 318/400.04 |
| 4,472,665 A | * | 9/1984 | Tanikoshi | 318/400.06 |
| 4,950,968 A | * | 8/1990 | Ogura | 318/599 |
| 5,463,299 A | * | 10/1995 | Futami et al. | 318/618 |
| 6,337,548 B2 | * | 1/2002 | Kawabata et al. | 318/400.04 |
| 6,479,956 B1 | * | 11/2002 | Kawabata et al. | 318/400.12 |
| 6,979,970 B2 | * | 12/2005 | Iwanaga et al. | 318/400.35 |
| 7,714,529 B2 | * | 5/2010 | Chen et al. | 318/712 |
| 8,237,385 B2 | * | 8/2012 | Street | 318/400.34 |

* cited by examiner

*Primary Examiner* — Walter Benson
*Assistant Examiner* — Thai Dinh
(74) *Attorney, Agent, or Firm* — Ming Chow; Sinorica, LLC

(57) ABSTRACT

A method of the Pulse Amplitude Modulation for the Sensorless Brushless motor, which includes a start-up circuit, a phase detect circuit, a phase commutation circuit, a driving circuit, BEMF detection circuit, and frequency detector, utilizes the control signal of the phase commutation circuit to control the driving circuit so as to drive the outer motor coil and detect the control signal for the driving motor driving circuit by a detection circuit. The motor system can be controlled to reduce the discharge speed to avoid the motor driving circuit shutdown and further speed up the start-up time for the next charging period of the motor driving circuit to achieve the effect of low speed rotation and power saving.

13 Claims, 12 Drawing Sheets

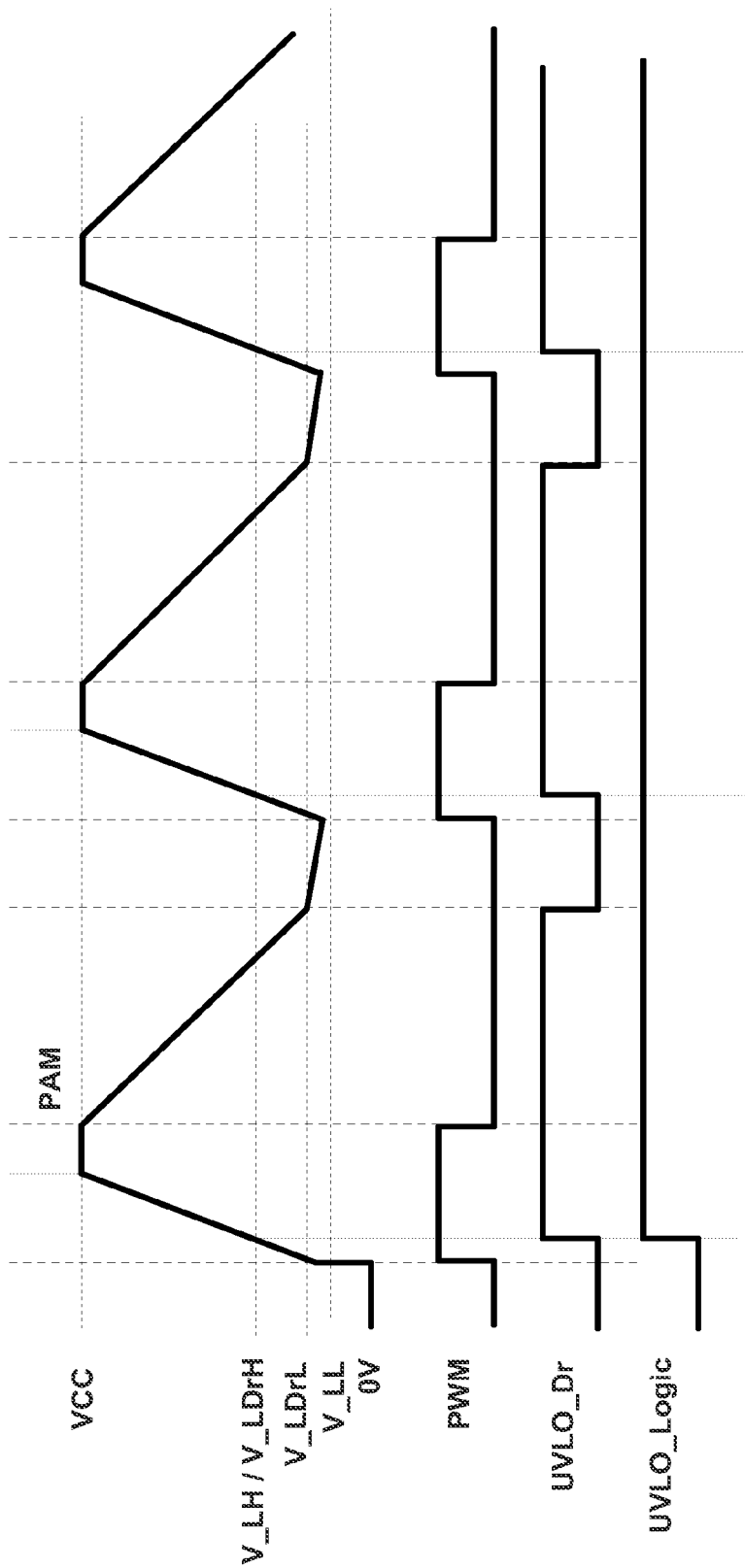

PULSE AMPLITUDE MODULATION METHOD FOR THE DC BRUSHLESS MOTOR

BACKGROUND OF THE INVENTION

1. Field of the Invention

The present invention is related to a pulse amplitude modulation method for the direct current (DC) brushless motor without using sensor device, and more particularly, related to a pulse amplitude modulation method utilizing a motor phase rotation driving device to control the signal to drive the motor driving circuit so as to avoid the motor driving circuit shutdown too early, and the motor driving circuit can be quickly recharged at the next startup period to achieve the power saving and the fart charging purpose.

2. Description of the Prior Art

The technique related to the DC brushless motor in prior art discloses a anti-noise method utilizing a startup circuit to output different startup frequencies and output different driving currents from the control circuit to pass through the driving coil of the external motor and feedback the external BEMF to detect by the detective circuit so as to determine the startup and the operation of the motor in order to guarantee the motor is working properly.

As shown in FIG. 1A, it is a block diagram illustrating that a DC brushless motor system without sensor device. As shown in FIG. 1A, the system includes an external motor 11, a control circuit 12, a output circuit 13, a detective circuit 14, a startup circuit 15, and a switching circuit 17. The startup circuit 15 outputs different driving frequencies square waves to the output circuit 13 and the corresponding output current is outputted to the driving coil of the external motor 11. The driving coil of the external motor 11 will generate the Back Electromotive Force (BEMF) to feedback to the detective circuit 14 and the detective circuit 14 will determine the rotation speed and the phase of the external motor 11 in accordance with the BEMF so as to control the startup and the rotation speed of the motor.

FIG. 1B is a view illustrating the conventional six-step motor driving circuit in the DC brushless motor. As shown in FIG. 1B, when the startup circuit 15 is activated to output the activated frequency signal to the control circuit 12, the signal is transformed to be a six steps driving control signal shown in FIG. 1B, into the output circuit 13. The current of the driving coil of the external motor 11 is accordance with the phase difference of the six steps driving control signal, and the rotation speed and the phase of the external motor 11 is determined by the current of the driving coil.

FIG. 2 is a view illustrating a conventional pulse amplitude modulation (PAM) circuit in prior art. As shown in FIG. 2, the PAM circuit 20 includes a first input transistor 201, a second input transistor 202, an internal resistor 203 and an output capacitance 204. When the pulse width modulation (PWM) control signal is inputted into the first input transistor 201 of the PAM circuit and the PWM control signal is in high voltage level, the first input transistor 201 is turned on and a current outputted from the voltage Vcc transmits to the internal resistor 203. A voltage drop is generated on the internal resistor 203 to turn on the second input transistor 202 and the current will transmit to the second input transistor 202 from the Vcc and the output capacitance will start to charge. When the PWM control signal is in low voltage level, the first input transistor 201 is turned off and a current outputted from the voltage Vcc stops transmitting to the internal resistor 203. The voltage drop is zero and the second input transistor 202 is still off and the output capacitance will start to discharge when the voltage is in low voltage. Still referring to FIG. 2, it is illustrating the input and the output of the PAM circuit. When the PWM control signal of the PAM circuit is in high voltage level, the PAM signal is the positive slope charge voltage. When the PWM control signal of the PAM circuit is in low voltage level, the PAM signal is the negative charge voltage.

As the description above, the PAM circuit 20 is configured to convert the PWM control signal to be the PAM driving signal so as to provide the entire driving system power. However, when the motor is rotated, the current is consumed to accelerate the discharge speed of the output capacitance. When the PWM control signal is not returned high voltage level, the output capacitance will keep discharging to a low working voltage of the system and the entire driving system would not work properly and the phase of the motor is required to reset and the pulse width of the PWM is limited.

As the PAM circuit described above, a detective circuit is disclosed in the present invention to detect in accordance with the PAM control signal. When a low voltage level is detected, the driving circuit is shutdown immediately to slow the discharging time to avoid the motor control phase circuit shutdown too early. Therefore, the motor six step driving voltage is outputted properly in the next charging period to extend the time of the low voltage level of the PWM so as to achieve the low rotation speed control and the power saving.

SUMMARY OF THE INVENTION

The present invention is to provide a direction current brushless motor system without sensor device having a detective circuit. The detective circuit can receive the Pulse Amplitude Modulation (PAM) control signal of the PAM circuit and output the detected control signal to the motor driving circuit so as to achieve the low rotation speed control and the power saving.

Another object of the present invention is to provide a direction current brushless motor system without sensor device by utilizing a detective circuit to receive the Pulse Amplitude Modulation (PAM) control signal of the PAM circuit and output the detected control signal to the motor driving circuit. The motor driving circuit is configured to drive the external motor and the external motor can generate a high voltage level detective signal by the BEMF detector to input to the phase detector so as to determine the rotation speed and the phase of the external motor. The new motor driving control signal is generated for the motor driving system to maintain the stability of the system.

One another object of the present invention is to provide a driving device in a direct current (DC) brushless motor system including a pulse amplitude modulation, a detective circuit, a driving circuit and a digital phase control circuit. The pulse amplitude modulation (PAM) circuit includes an input end connected to a pulse width modulation (PWM) and outputting a PAM signal. The detective circuit includes a first comparator and a second comparator, and a first input end of the first comparator is connected to a first voltage circuit and a second input end is connected to a first level voltage and outputs a first signal, and a first input of the second comparator is connected to a second voltage circuit and a second input is connected to a second level voltage and outputs a second signal, wherein an input end of the first voltage circuit is connected to the PAM control signal and an input end of the second voltage circuit is connected to the first signal. The driving circuit includes one input end connected to the PAM circuit, another input end connected to the second signal of the detective circuit and an output end connected to the external motor. The digital phase control circuit includes one input end connected to the PAM circuit, another input end connected to the first signal of the detective circuit and an output end connected to the driving circuit.

Moreover, one more object of the present invention is to provide A direct current (DC) brushless motor system including a control device, a switching device, a startup device, a detective device, a driving circuit, a phase lock loop frequency device. The control device includes one end connected to an oscillation device. The switching device includes one end connected to the other end of the control device. The startup device includes one end connected to the other end of the switching device. The detective device includes one end of the detective device connected to the other end of the startup device. The driving circuit includes one end of the driving circuit connected to the other end of the detective device and the other end connected to an external motor; and feedbacks to the other end of the detective circuit from a three-phase coil of the external motor. The phase lock loop frequency device is connected to the detective device. The driving device includes a pulse amplitude modulation (PAM) circuit including an input end is connected to the detective device; a detective circuit, one input thereof is connected to the PAM circuit; a driving circuit, and one input end of the driving circuit is connected to the PAM circuit, one another input end is connected to the output end of the detective circuit and an output end is connected to the external motor; and a digital phase control circuit, and one input end of the digital phase control circuit is connected to the PAM circuit, one another input end is connected to the another output end of the detective circuit and an output end is connected to the driving circuit.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 9 is a waveform diagram illustrating the charging and discharging of the detective circuit in the present invention.

DESCRIPTION OF THE PREFERRED EMBODIMENT

A detective circuit is disclosed in the present invention configured to receive a pulse amplitude modulation (PAM control signal) outputted from a PAM circuit. The detective circuit outputs detected control signal to the motor driving device 35 to slow the discharging time of the PAM control signal to avoid the driving device 35 shutdown too early. Therefore, the driving device can quickly startup at the next period when the PAM control signal is in charging so as to achieve the low rotation speed control and the power saving.

Figure 1A:
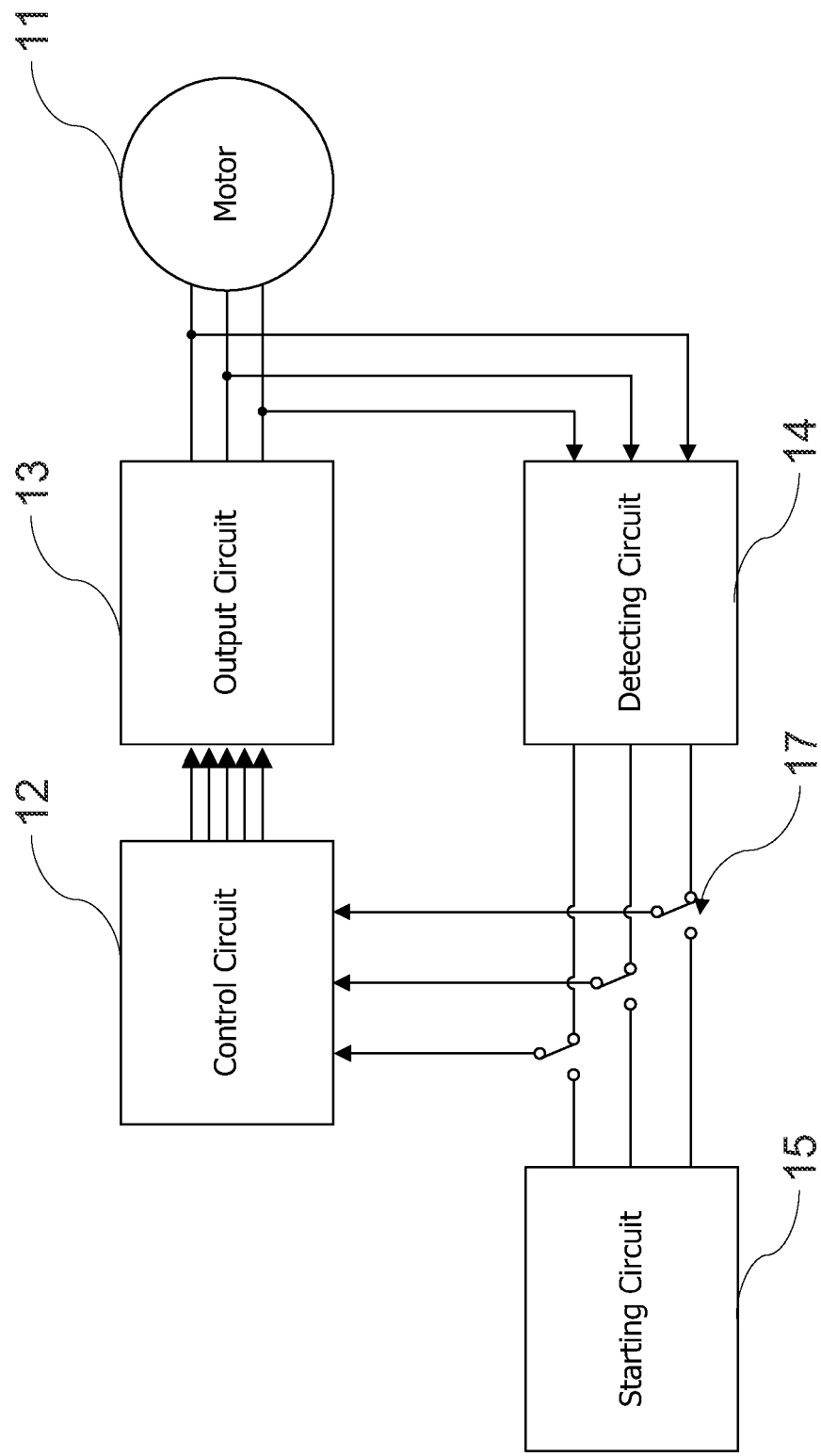
FIG. 1A is a block diagram illustrating a direct current (DC) brushless motor system without sensor device in prior art.
Figure 1B:
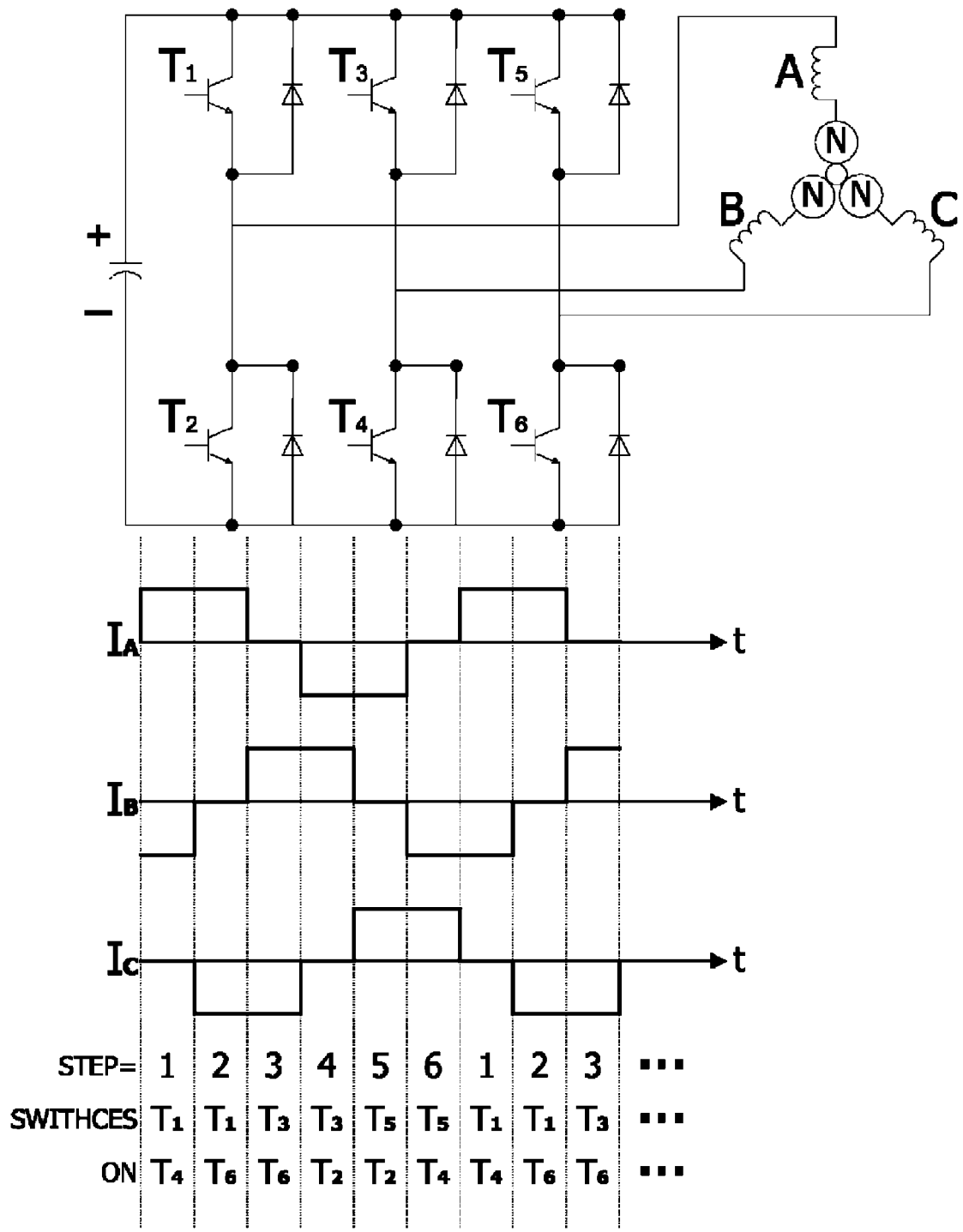
FIG. 1B is a view illustrating a six steps motor driving method circuit in prior art.
Figure 2:
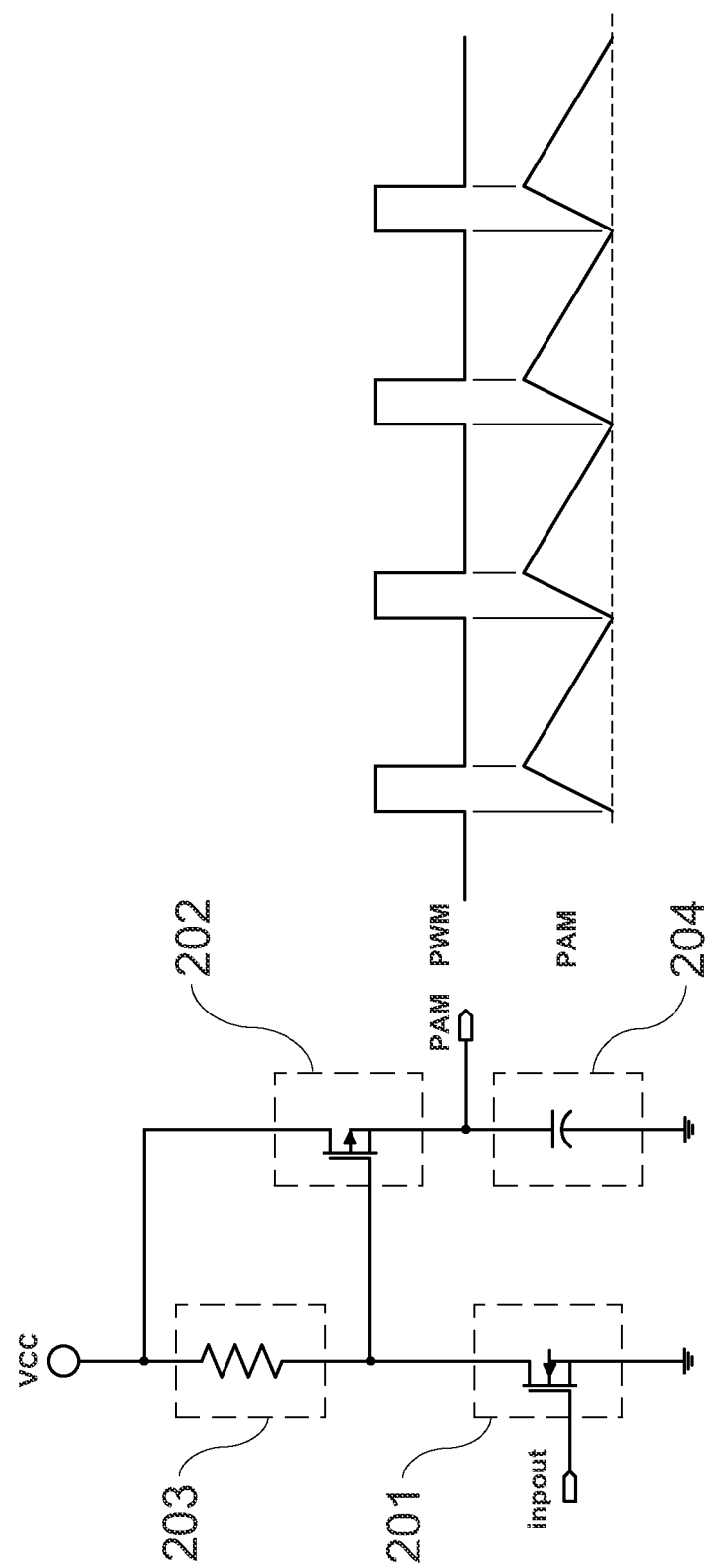
FIG. 2 is a view illustrating a Back Electromotive Force (BEMF) circuit in prior art.
Figure 3:
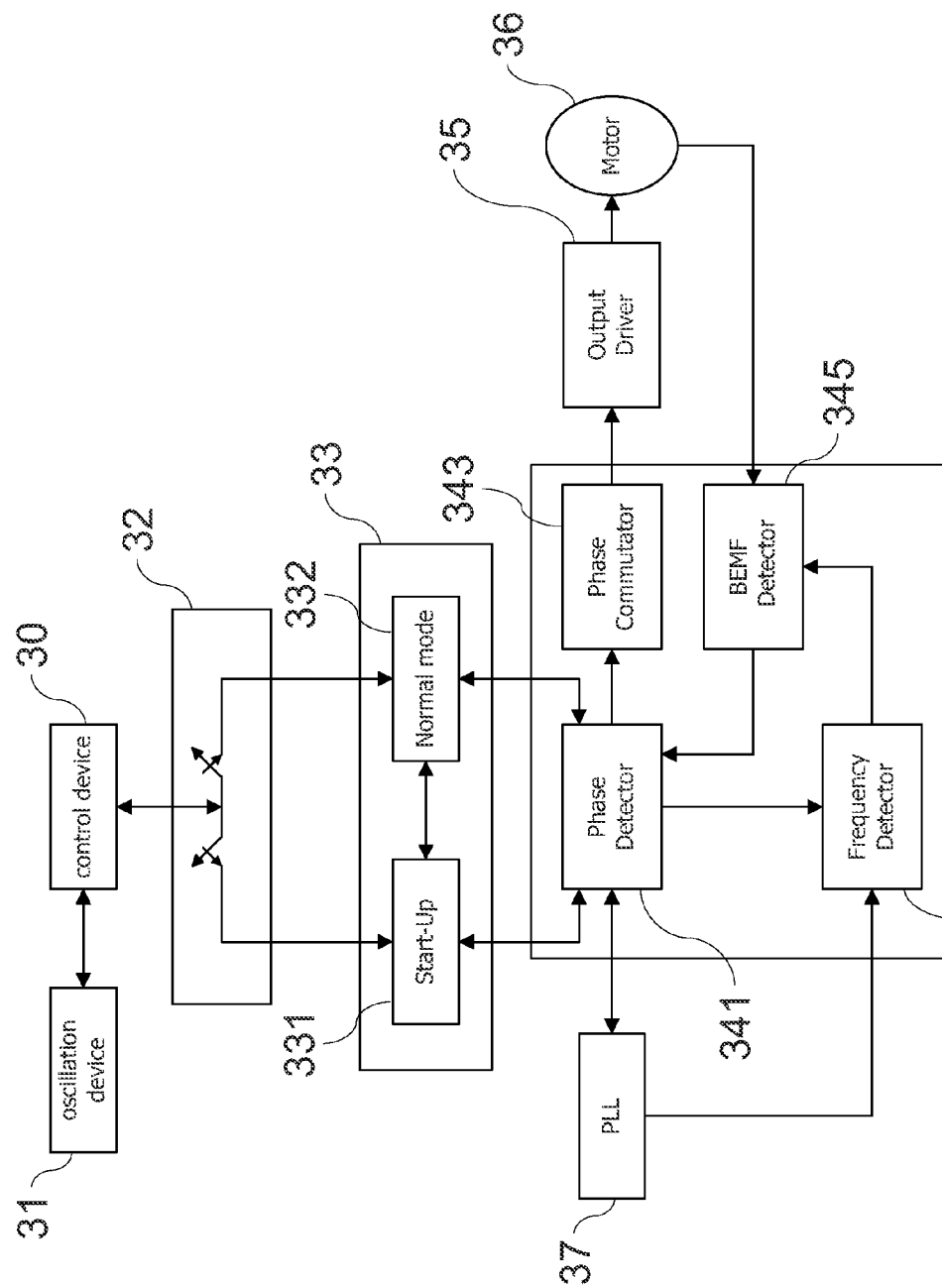
FIG. 3 is a structure view illustrating a motor driving circuit in the present invention.

First of all, please referring to FIG. 3, it is a block diagram illustrating a DC brushless motor system without sensor device. As shown in FIG. 3, the DC brushless motor system includes a control device 30 and the input end thereof is connected to the oscillation device 31. The input end of the switch device 32 is connected to the control device 30 and the output end thereof is connected to the startup device 33. The startup device 33 includes a startup circuit 331 and the normal rotation circuit 333. The detective device 34 includes a phase detective circuit 341, a phase rotation circuit 343, a Back Electromotive Force (BEMF) detector 345 and a frequency detector 347. The input end of the driving circuit 35 is connected to the phase rotation circuit 343 of the detective circuit 34 and the output end thereof is connected to the external motor 36. The phase detective circuit 341 of the detective device 34 is connected to the startup device 33, the phase lock frequency device 37 and the phase rotation circuit 343. The BEMF detective circuit 345 is connected to the external motor 36, the phase lock frequency device 37 and the phase rotation circuit 343. The BEMF detective circuit 345 is connected to the external motor 36, the phase detective circuit 341 and the frequency detective circuit 347. The frequency detective circuit 347 is connected to the phase lock frequency device 37.

When the DC brushless motor system is activated, the control device will control the oscillation device 31 to output an oscillation signal. The startup circuit 331 will activate the rotation speed in accordance with the oscillation signal generated form the oscillation device 31 and the rotation speed will input to the phase detective circuit 341. The phase detective circuit 341 will output the corresponding three-phase driving voltage in accordance with the rotation speed and the rotation speed is transformed into the corresponding six steps driving voltage to the motor driving circuit 35 so as to drive the external motor 36. When the external motor 36 is activated, the BEMF is generated by the current difference in the motor coil and inputted to the BEMF detector 345. The BEMF detector 345 will detect the rotation speed and the phase of the external motor 36 in accordance with the sampled BEMF. At this moment, when the startup rotation speed of the motor is not more than the first predetermined startup rotation speed, the control device 30 will request the oscillation device 31 to transmit the signal continually so as to force the motor rotating. When the rotation speed of the motor is more than the first predetermined startup rotation speed (for example the first determined startup rotation speed is 30 rpm), the control device 30 will activate the switch device 32 to switch the startup device 33 to be the normal rotation circuit 333 and the driving motor will start rotating in accordance with the signal provided by the normal rotation circuit 333.

Similarly, after the control device 30 switches the startup device 33 to the normal rotation circuit 333, the phase detective circuit 341 will detect the normal rotation speed of the motor. Therefore, the phase detective circuit 341 will output the corresponding three-phase driving circuit in accordance with the normal rotation speed of the motor. At the time, the external motor 36 will generate the BEMF in accordance with the current different of the motor coil and input it to the BEMF detector 345. The BEMF detector 345 will detect the rotation speed and the phase of the external motor in accordance with the sampled BEMF. It should be noted that the control device will further detect if the rotation speed of the motor is in the second predetermined startup rotation speed in the preferred embodiment of the present invention (for example the second predetermined startup rotation speed is 180 rpm). When the BEMF detector 345 detects the rotation speed of the motor is not at 180 rpm, it means that the motor has not been activated. Therefore, the control device 30 will drive the switch device 33 to switch the startup device 33 to the startup circuit 331 and request the motor to rotate according to the signal provided by the startup circuit 331. When the phase detective 341 determines that the rotation speed of the motor is in the first predetermined rotation speed, the control device 30 will drive the switch device 32 to switch the startup device 33 to be the normal rotation circuit 302. When the rotation speed of the motor detected by the BEMF detective circuit 341 is more than the second predetermined startup rotation speed (the speed is 180 rpm), it means that the motor is rotated properly in accordance with the signal of the normal rotation circuit 333. At this moment, the control device 30 will determine that the motor has been activated and the startup device 22 is connected to the normal rotation circuit 333. Finally, the BEMF detective circuit 345 will detect the current rotation speed and the phase of the external motor 36 and output the signal to the phase detective circuit 341 to confirm that the driving frequency of the output of the external motor 36 is equal to the output of the phase detective circuit 341.

The motor driving device 35 in the present invention further includes a detective circuit 352. The detective circuit 352 can receive the PAM control signal outputted from the external PAM circuit 39 to do the detecting process and output the detective signal to control the motor driving device 35. The PAM circuit 39 is an external circuit outside of the motor driving device 35 and the PWM signal inputted to the PAM circuit 39 is provided by the DC brushless motor system.

Figure 4:
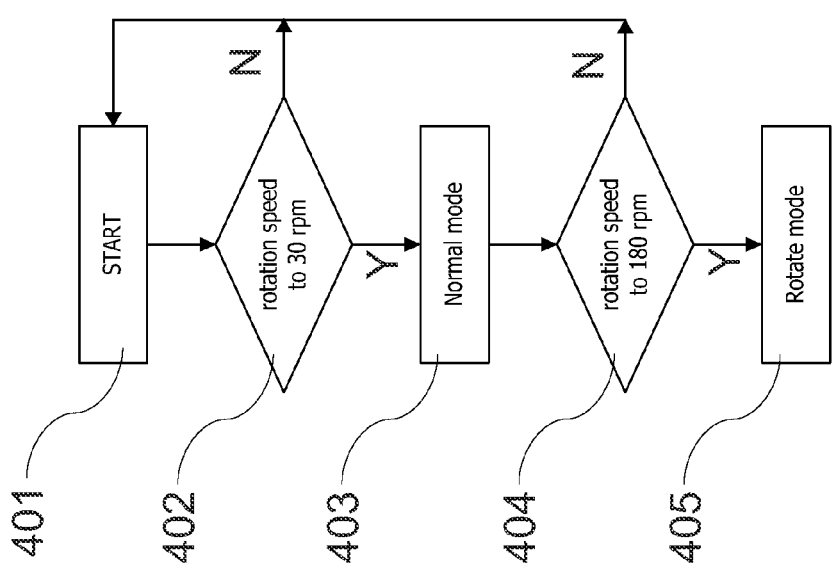
FIG. 4 is a view illustrating a startup mode in the present invention.

Now, please referring to FIG. 4, it is a flow chart illustrating the activated steps of the DC brushless motor system without sensor device. First, at step 401, in the first activated step, the control device 30 of the DC brushless motor system without sensor device will request the oscillation device to output an oscillation signal to the startup circuit 331. The motor 36 will be activated to generate a startup rotation speed. The startup rotation speed of the motor 36 will pass through the BEMF detector 345 to the phase detective circuit 341. A step 402, the control device 30 will continually detect the startup rotation speed of the motor 36. When the startup rotation speed of the motor 36 is in the first predetermined rotation speed, such as the first predetermined rotation speed is 30 rpm, the control device will be in step 403. At step 403, the startup rotation speed of the motor 36 will be in the first predetermined rotation speed, the control device 30 will drive the switch device 32 to switch the startup device 33 to be the normal operative mode and the motor 36 will be rotate properly. Then, at step 404, the control device 30 will continuingly detect the rotation speed of the motor 36. When the rotation speed of the motor 36 will be in the second predetermined rotation speed, such as the second predetermined rotation speed is 180 rpm, the motor 36 has been activated. At step 405, the control device 30 will terminate the startup procedure and the motor 36 is still in the normal operative mode so as to be the predetermined operative rotation speed in the DC brushless motor system without sensor device. On the other hand, when the control device 30 activates the motors 36 and the rotation speed is not in the first predetermined rotation speed, the control device 30 will stay at step 402 and the control device will force the oscillation 31 of the motor system to continually output the oscillation signal to speed up the rotation speed of the motor till the rotation speed is in the first predetermined rotation speed.

The control device 30 will drive the startup device 33 to switch the startup device 33 to be the normal operative mode to the motor keep outputting the rotation speed. When the DC brushless motor system without sensor device is not able to be in the second predetermined rotation speed by the phase detective circuit 341, the motor is not activated properly, as shown in step 404. At this moment, the control device 30 will go back to step 402, the control device 30 will drive the startup device to switch back to the startup circuit 331 to force the motor system to keep outputting the oscillation signal so as to make sure when the motor is in the first predetermined rotation speed and the second activated frequency, the system will go to step 405 and the motion of the system startup is done.

The startup steps in FIG. 4 and the block diagram in FIG. 3 will be further discussed at the following description. First, as shown in step 401, the control device 30 of the motor system will output an oscillation signal so as to drive the switch device 32 to switch the startup circuit 32 to be the startup circuit 331. The startup circuit 331 will transform the oscillation frequency outputted from the oscillation device 31 and output a startup rotation speed to the phase detective circuit 341. The system will go to step 402, the motor system is in the first activation mode and the startup rotation speed of the motor will be continually detected. The phase detective circuit will output the corresponding three-phase driving control signal in accordance with the activated rotation speed outputted by the startup circuit 331 to the phase rotation circuit 343. The phase rotation circuit 343 will convert the three-phase driving control signal to be the six steps driving voltage to the motor driving circuit 35. The motor driving circuit 35 determines the three-phase current in accordance with the six steps driving voltage and the three-phase current will output to the driving coil of the external motor 36 to force the external motor 36 rotating. The phase switching of the three-phase current is determined according to the phase difference of the six steps driving voltage of the motor driving circuit 35. Because the six steps driving voltage is a three-phase switching driving voltage, there is only one phase in Stop State at the same time. At the Stop State, the external motor 36 will stop providing the current on the driving coil. Because of the electromagnetic effect, when the current on the driving coil is stopped, a BEMF will be generated. By utilizing the phase and the frequency of the BEMF, the BEMF is inputted to the BEMF detector 345 to detect the anti-noise ration of the BEMF and the rotation speed and the rotor phase of the external motor 36. However, when the rotation speed of the external motor 36 is not at the first startup rotation speed (such as 30 rpm), the amplifier of the BEMF on the driving coil of the external motor 36 is not large enough and the detective ability of the BEMF detector 345 on the anti-noise of the BEMF is weak. Therefore, The PWM signal outputted from the BEMF detector 345 is easily affected by the noise so as to have an uncertain output value. When the PWM rotation control signal outputted from the BEMF detector 345 is inputted to the phase detective circuit 341, the phase detective circuit 341 will determine the rotation speed of the external motor 36 in accordance with the PWM rotation control signal. When the rotation speed of the external motor 36 is in the first activated rotation speed (ex: 30 rpm), the system will go to step 403. The control device 30 will drive the switch device 32 to switch the startup circuit 331 to the normal rotation circuit 333 and the DC brushless motor is in the normal operative mode. However, the external motor 36 starts to work but it is not in completely start condition. When the rotation speed of the external motor 36 is in the first predetermined startup rotation speed (30 rpm), the system will switch the detective frequency of the detective circuit 341 in the second predetermined startup rotation speed (180 rpm). In the present embodiment, the second predetermined startup rotation speed (180 rpm) is the multiple of the first predetermined startup rotation speed (30 rpm). The motor system will enter the second startup mode from the first startup mode and continually detect the rotation speed of the external motor 36 at step 404. The normal rotation circuit 333 in the startup device 33 will generate the startup rotation speed, which will continually speed up, to the phase detective circuit 341. The phase detective circuit 341 generates three-phase driving control signal in accordance with the startup rotation speed and the three-phase driving control signal is inputted to the phase rotation circuit 343. By converting in the internal circuit of the phase rotation circuit 343, the phase rotation circuit 343 will output a six steps driving voltage to the motor driving circuit 35. The six steps driving voltage will convert to be three-phase current by the motor driving circuit 35 and transmit to the driving coil of the external motor 36. As the description above, the driving current supply on the driving coil of the external motor 36 is corresponding to the six steps driving voltage of the phase rotation circuit 343 and there is only one coil phase stayed in Stop State at the same time. According to the electromagnetic effect, a larger BEMF is generated and transmitted to the BEMF detective circuit 345. Because the BEMF is larger, the ability of the anti-noise is better. The BEMF detective circuit 345 is able to detect the phase of the BEMF properly so as to output the corresponding PWM rotation speed control signal and feed back to the phase detective circuit 341. When the PWM rotation speed control signal is in the second predetermined startup rotation speed (the multiple of 30, such as 180 rpm=30 rpm×6), the startup device 33 will go to step 405 to finish the complete startup steps.

According to the description above, when the DC brushless motor system is in step 402 (the first startup step), the motor system will continually detect the rotation speed of the external motor 36. When the startup rotation speed of the external motor 36 is not in the first predetermined startup rotation speed (30 rpm), the motor system will keep staying in step 402. The BEMF generated by the driving coil of the external motor 36 is directly proportional to the driving voltage on the driving coil of the external motor 36, which is in low rotation speed state. The anti-noise ratio of the BEMF detected by the BEMF detective circuit 345 is weak and the PWM rotation control signal detected by the phase detective circuit 341 is showing that the rotation speed is not going to represent that the motor system is being started normally. Therefore, when the external motor 36 is in the first predetermined startup rotation speed (30 rpm), at step 403, it is going to the normal step. The control device 30 drive the switch device 32 to switch to the normal rotation circuit 333 in the second startup mode from the first startup mode. The BEMF generated by the driving coil of the external motor 306 is large enough to detect the rotation speed and the phase of the external motor 36 for the BEMF detector 345. The motor system will go to step 404 and continually detect the startup rotation speed of the external motor 36. If the PWM rotation control signal detected by the phase detective circuit 341 is not larger than the first predetermined startup rotation speed or the control signal is not in the second predetermined startup rotation speed during a predetermined period, the control device 30 will determine that the startup of the external motor is failure and the motor system will go back to step 402 and the previous step will be repeated till the phase detective circuit 341 detects the rotation speed of the motor is in the first predetermined startup rotation speed (30 rpm) and the second rotation speed (180 rpm). On the other hand, if the phase detective circuit 341 detects the PWM rotation speed control signal is in the second predetermined rotation speed (180 rpm), the motor system finishes the startup procedure. The control device 30 will keep working to speed up the rotation speed to the high speed rotation mode.

Figure 5:
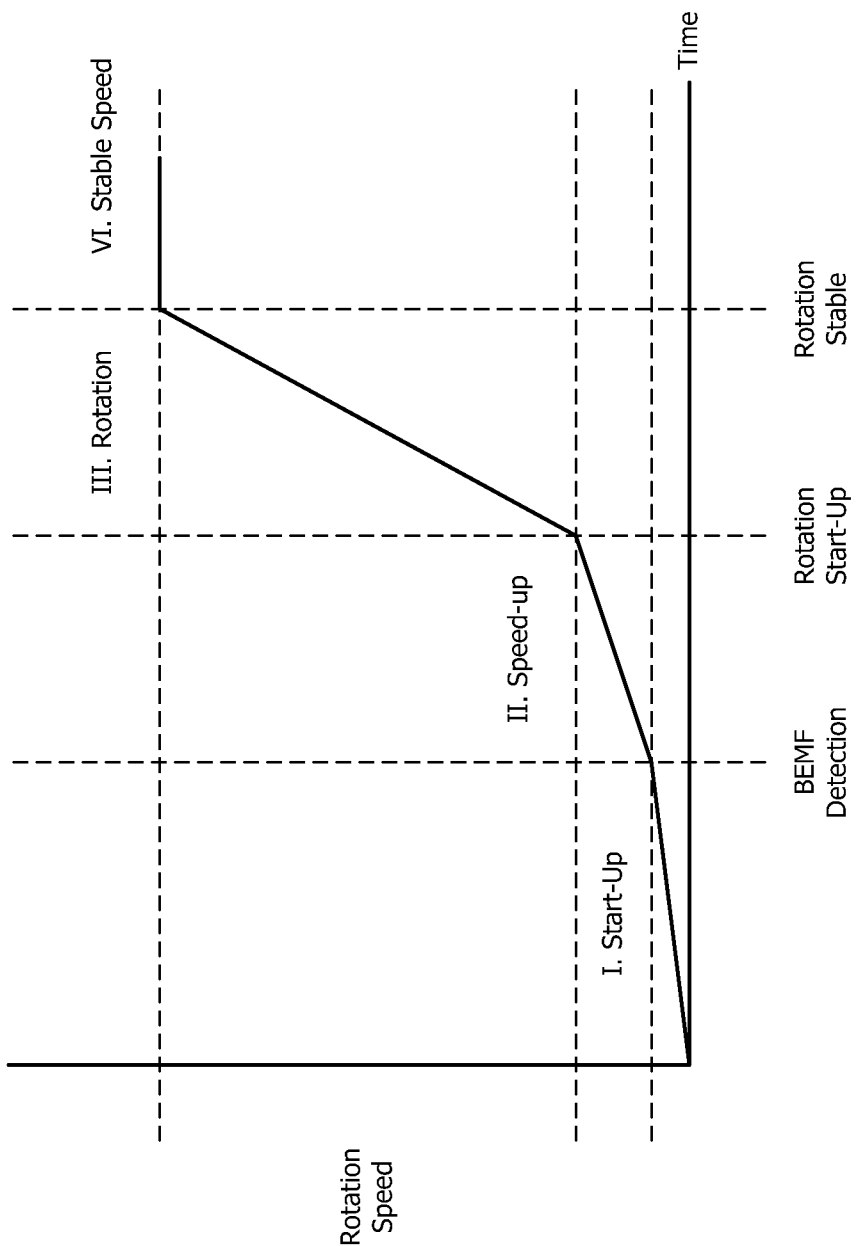
FIG. 5 is a waveform diagram illustrating the startup mode in the present invention.

Now referring to FIG. 5, it is a view to show that the startup mode is switched in the DC brushless motor system. As shown in FIG. 5, the startup mode includes four sections, the first section is the initial section, the second section is the speedup section, the third section is the rotation section and the forth section is the stable rotation section. The first section is the low rotation speed mode, an the control device 30 will drive the motor driving system. The BEMF generated by the external motor 36 is not large enough to determine that the motor system is in normal startup mode. When the motor driving system enters the second section, the BEMF generated by the driving coil of the external motor 36 is large enough to detect the rotation speed and the rotor phase of the external motor 36 so as to confirm the motor system is successfully started. When the rotation speed of the external motor 36 is in the second predetermined startup rotation speed (180 rpm), it means that the motor is completely started in the third section. At this moment, the rotation speed of the external motor 36 keeps going up and the system is in the third section. The external motor 36 is in the predetermined high rotation speed state, the stable state in the forth section.

Figure 6A:
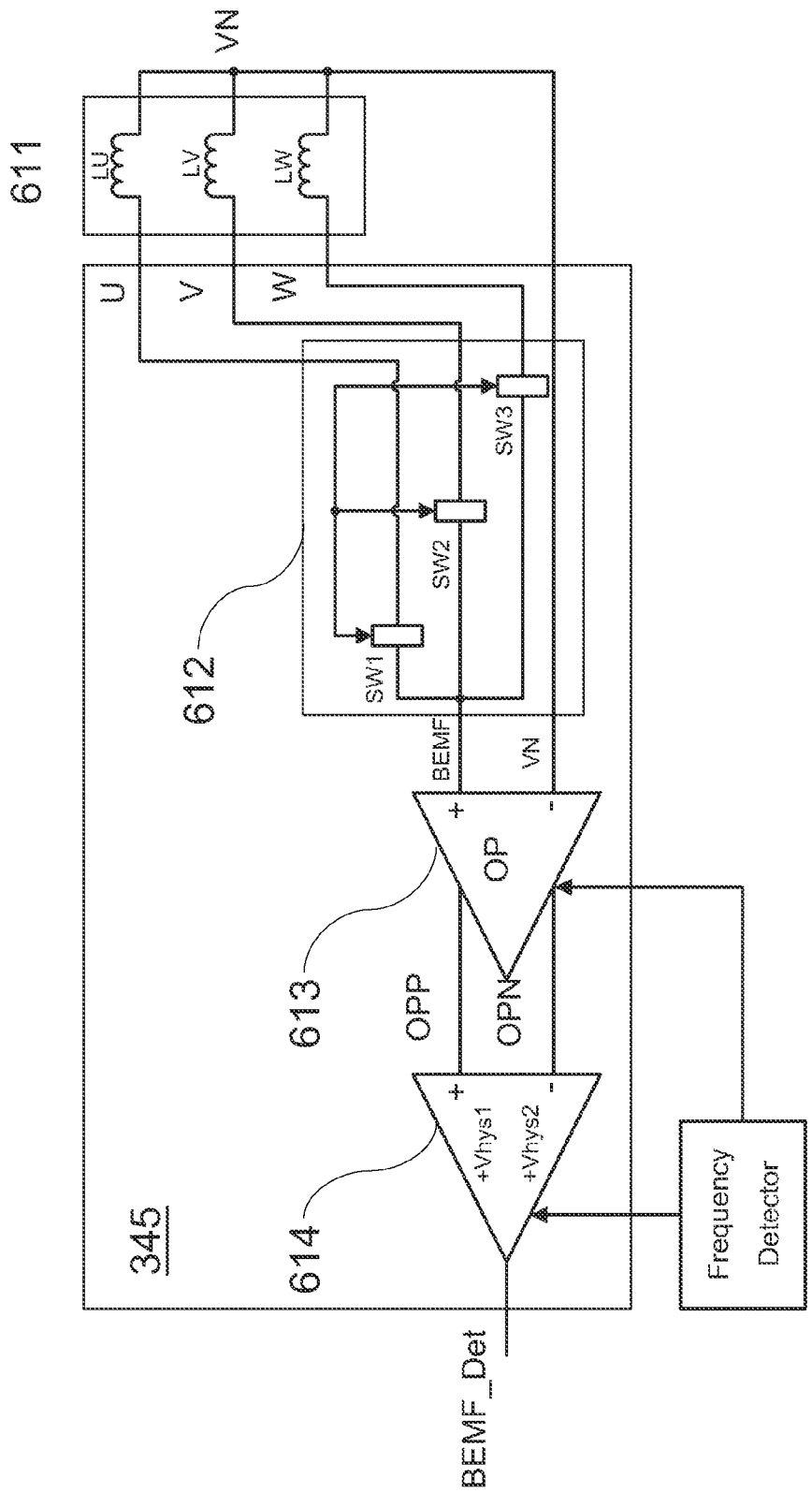
FIG. 6a is a structure view illustrating the BEMF detector in the present invention.

Now referring to FIG. 6a, it is a view illustrating the structure of the BEMF detector of the DC brushless motor system. As shown in FIG. 6, the BEMF detector 345 of the DC brushless motor system includes a BEMF detective switch 612, a BEMF amplifier 613, and a hysteresis comparator 614. The BEMF amplifier 613 and the hysteresis comparator 614 are respectively connected to the output of the frequency detector 347. The BEMF detective switch 612 is connected to the three-phase coil 611 at outside of the DC brushless motor system.

As shown in FIG. 6a, when the DC brushless motor system is activated, the three-phase current on the external motor 36 is going to the three-phase coil 611, and the three-phase coil 611 will generate the BEMF signal in accordance with the time difference of the three-phase current. In addition, the BEMF detective switch 612 determines the sequence of the internal switching in accordance with the difference of the three-phase current on the three-phase coil 611. Therefore, the BEMF signal generated by the three-phase coil 611 will can pass through the switching control by the BEMF detective switch 612. The BEMF signal passed through the switching control will be transmitted to the BEMF amplifier 613 to compare with a voltage reference $V_N$. The voltage reference $V_N$ is one haft of the system voltage (½ Vcc) and is the initial voltage of the three-phase coil 611 and the system voltage is the standard Vcc of the motor driving system. When the BEMF signal is larger than the voltage reference $V_N$, the sine voltage OPP outputted by the BEMF amplifier 613 is the positive level sine voltage. On the other hand, when the BEMF signal is smaller than the voltage reference $V_N$, the sine voltage OPN outputted by the BEMF amplifier 613 is the negative level sine voltage. Therefore, the BEMF amplifier 613 will transmit the signal of the sine voltage OPP and the sine voltage OPN to the input end of the hysteresis comparator 614. The hysteresis comparator 614 will determine the high level and the low level of the signal of the hysteresis comparator 614 in accordance with the sine wave OPP, sine wave OPN and internal hysteresis voltage (±Vhys). For example, when the inputted sine voltage OPP is larger than the internal hysteresis voltage, the BEMF detective signal BEMF_Det outputted by the hysteresis comparator 614 is in high level. When the inputted sine voltage OPP is smaller than the internal hysteresis voltage, the BEMF detective signal BEMF_Det outputted by the hysteresis comparator 614 is in low level.

Subsequently, the BEMF detective signal BEMF_Det is transmitted to the phase detective circuit 341 (as shown in FIG. 3), and the phase detective circuit 341 determines the rotation speed and the phase of the external motor 36 in accordance with the duration of the voltage level of the BEMF detective signal (BEMF_Det). When the motor 36 is in the startup duration, because the rotational speed is not fast (60 rpm), the BEMF signal generated on the three-phase coil 611 is not large. The BEMF signal detected by the BEMF detector 345 is not large enough to resist the noise generated by the system. Therefore, the rotation speed and the phase of the external motor 36 detected in accordance with the BEMF signal (BEMF_Det) by the phase detective circuit 341 is distortion. The motor 36 is activated when the phase detective circuit 341 detects the rotation speed of the external motor 36 in the first predetermined rotation speed and the second predetermined rotation speed in accordance with the BEMF signal (BEMF_Det), the rotation speed is fast enough (1000 rpm) and the BEMF signal detected by the three-phase coil 611 is large enough to resist the system noise. At this moment, the BEMF amplifier 613 of the BEMF detector 345 will determine the voltage gain and the hysteresis comparator 614 will also determine the internal hysteresis level in accordance with the gain control signal outputted by the frequency detector 347. The gain control signal outputted by the frequency detector 347 is generated by comparing the rotation speed of the external motor 36 and the predetermined frequency outputted by the phase lock loop circuit 37.

Subsequently, when the rotation speed of the external motor 36 is not the same as the outputted frequency of the phase lock loop circuit 37 (ex: 2000 rotations or 3000 rotations), the gain control signal outputted by the frequency detector 347 is low voltage. The BEMF amplifier 613 of the BEMF detective circuit 345 will switch to the normal voltage gain mode (the first voltage gain mode). The BEMF amplifier 613 will sequentially output the sine wave voltage OPP and OPN of the BEMF signal to the hysteresis comparator 614 (please referring to FIG. 7A, and the detail description is in the following chapter). On the other hand, when the gain control signal outputted by the frequency detector 347 is low voltage, the sine wave voltages OPP and OPN of the BEMF signal outputted by the BEMF amplifier 613 is the normal voltage gain mode (the first voltage gain mode). The hysteresis level of the hysteresis comparator 614 is in the first hysteresis level (+Vhys) to resist the initial noise of the system. Now, the BEMF amplifier 613 will compare the BEMF signal detected by the three-phase coil 611 and the level voltage $V_N$ the signal is adjusted by the voltage of the frequency detector 347. The sine wave voltages OPP and OPN are inputted to the hysteresis comparator 614, the BEMF detective signal (BEMF_Det) outputted by the hysteresis comparator 614 is also inputted to the phase detective circuit 341 to determine the rotation speed and the phase of the external motor 36.

When the rotation speed of the external motor 36 is in the second predetermined rotation speed and the rotation speed of the external motor 36 is increased. For example, the rotation speed of the external motor 36 is in the predetermined frequency (2000 rotations or 3000 rotation), the gain control signal outputted by the frequency detector 347 will switch to be high voltage. The control device 30 in FIG. 3 will utilize two implemented methods to have good anti-noise ration. At first, the first implemented method is to control the BEMF detector 345 by the control frequency detector 347 of the phase detective circuit 341 and drive the BEMF amplifier 613 of the BEMF detector 345 to switch to the voltage suppressing mode (the second voltage gain mode) from the normal voltage gain mode. The sine wave voltages OPP and OPN outputted by the BEMF amplifier 613 will not be continually increased in accordance with the BEMF signal, and the sine wave voltage OPP and OPN is maintained in low speed state. On the other hand, in the present embodiment, when the gain control signal outputted by the frequency detector 347 is changed to be high voltage, the amplitude of the sine wave voltages OPP and OPN outputted by the BEMF amplifier 613 is suppressed as the same as the normal voltage gain mode (the first voltage gain mode). In addition, in the second implemented method, the frequency detector 347 controlled by the phase detective circuit 341 is configured to control the BEMF detector 345 and the internal hysteresis level of the hysteresis comparator 614 of the BEMF detector 345 is switched from the first hysteresis level (+Vhys) to be the second hysteresis level (+Vhys2) to resist the noise of the high rotation speed of the system. Obviously, the voltage level of the second hysteresis level (+Vhys2) is larger than the first hysteresis level (+Vhys).

According to the first implemented method described above, the BEMF amplifier 613 will suppress the voltage of the BEMF signal and compare to the level voltage $V_N$. After the voltage suppressing in the frequency detector 347, the sine wave voltages OPP and OPN outputted by the BEMF amplifier 613 at the first voltage gain mode and the second voltage gain mode include the same amplitude and are inputted to the hysteresis comparator 614. The hysteresis comparator 614 will compare the sine wave voltages OPP and OPN with the first hysteresis level (+Vhys). When the sine wave voltage OPP is larger than the first hysteresis level, the BEMF detective signal (BEMF_Detc) outputted by the hysteresis comparator 614 will be low voltage level. The BEMF detective signal (BEMF_Detc) outputted by the hysteresis comparator 614 will be inputted to the phase detective circuit 341 to determine the rotation speed and the phase of the external motor 36 so as to accurately detect and sample the rotation speed and the phase of the external motor 36.

Figure 6B:
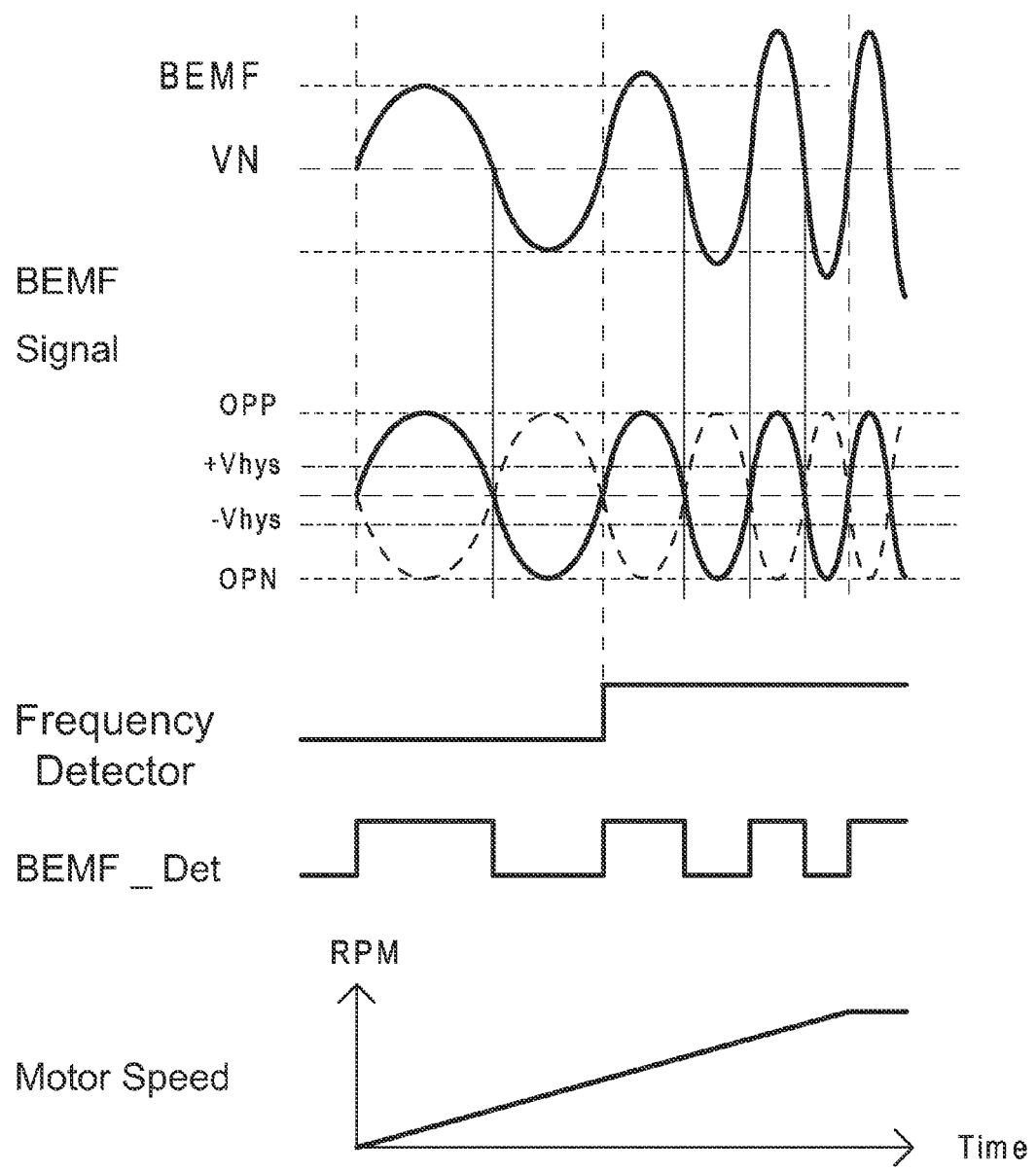
FIG. 6b is a waveform diagram illustrating the BEMF detector sampling level in the present invention.

Subsequently, the signal wave diagram of the operation in the present invention is further described herein. Please referring to FIG. 6b and FIG. 6c, it is a signal wave diagram illustrating the rotation speed of the DC brushless motor and the BEMF detector in the present invention. As shown in FIG. 6b, the BEMF signal generated by the current sequential difference on the three-phase coil 611 of the external motor 36 is inputted to the BEMF detector 345 and the BEMF signal waveform is a sine wave voltage waveform. The BEMF amplifier 613 within the BEMF detector 345 will generate the normal voltage gain mode and the voltage suppressing mode in accordance the control signal of the frequency detector 347. When the motor is in the first startup mode (the gain control signal outputted by the frequency detector 347 is the low voltage), the BEMF amplifier will compare the level voltage $V_N$ and the BEMF signal. As shown in FIG. 7A, when it is in the first voltage gain mode, the BEMF signal is larger than the level voltage $V_N$, the sine wave voltage OPP outputted by the BEMF amplifier 613 is in the positive voltage sine wave, and the sine wave OPN is in the negative sine wave. The second level is in the startup mode, but it is not achieved to the predetermined frequency outputted by the phase lock loop circuit (2000 rotation or 3000 rotation). The gain control signal outputted by the frequency detector 347 is in the low voltage state. And the BEMF amplifier 613 will keep comparing the level voltage $V_N$ and the BEMF signal and output the sine wave voltage OPP and OPN. The sine wave voltage OPP and OPN will be inputted to the hysteresis comparator 614. Now, the hysteresis comparator 614 will compare the sine wave voltage OPP and OPN with the first hysteresis lever (+Vhys). When the sine wave voltage OPP is larger than the first hysteresis level (+Vhys), the BEMF detective signal (BEMF_Detc) of the hysteresis comparator 614 is in high voltage level. When the sine wave voltage OPP is less than the first hysteresis level, the BEMF detective signal of the hysteresis comparator 614 is in the low voltage level. Obviously, the first hysteresis lever (+Vhys) is configured to resist the low noise when the motor driving system is in the low rotation speed. When the rotation speed of the external motor 36 is in the predetermined frequency (2000 rotation or 3000 rotation), the motor is in high rotation speed. The gain control signal outputted by the frequency detector 347 is changed to be high voltage and the noise of the gain control signal is also become large. The BEMF amplifier 613 will do the voltage suppressing action (the second voltage gain mode) in accordance with the control signal of the frequency detector 347. According to FIG. 7, at the second voltage gain mode, the larger BEMF signal will be suppressed and the suppressed BEMF signal is closed the BEMF signal in low rotation speed (the first voltage gain mode). The system noise of the motor driving system will also be suppressed and the suppressed BEMF signal will be inputted to the hysteresis comparator 614 and compared with the first hysteresis level (+Vhys). Obviously, the period of the sine wave voltage OPP and OPN in the second voltage gain mode is faster than in the first voltage gain mode. When the sine wave voltage OPP is lower than the first hysteresis level, the BEMF detective signal outputted by the hysteresis comparator 614 will be in the low level. The BEMF detective signal (BEMF_Dect) can avoid the distortion caused by the noise so as to achieve the goal of suppressing the noise.

Figure 6C:
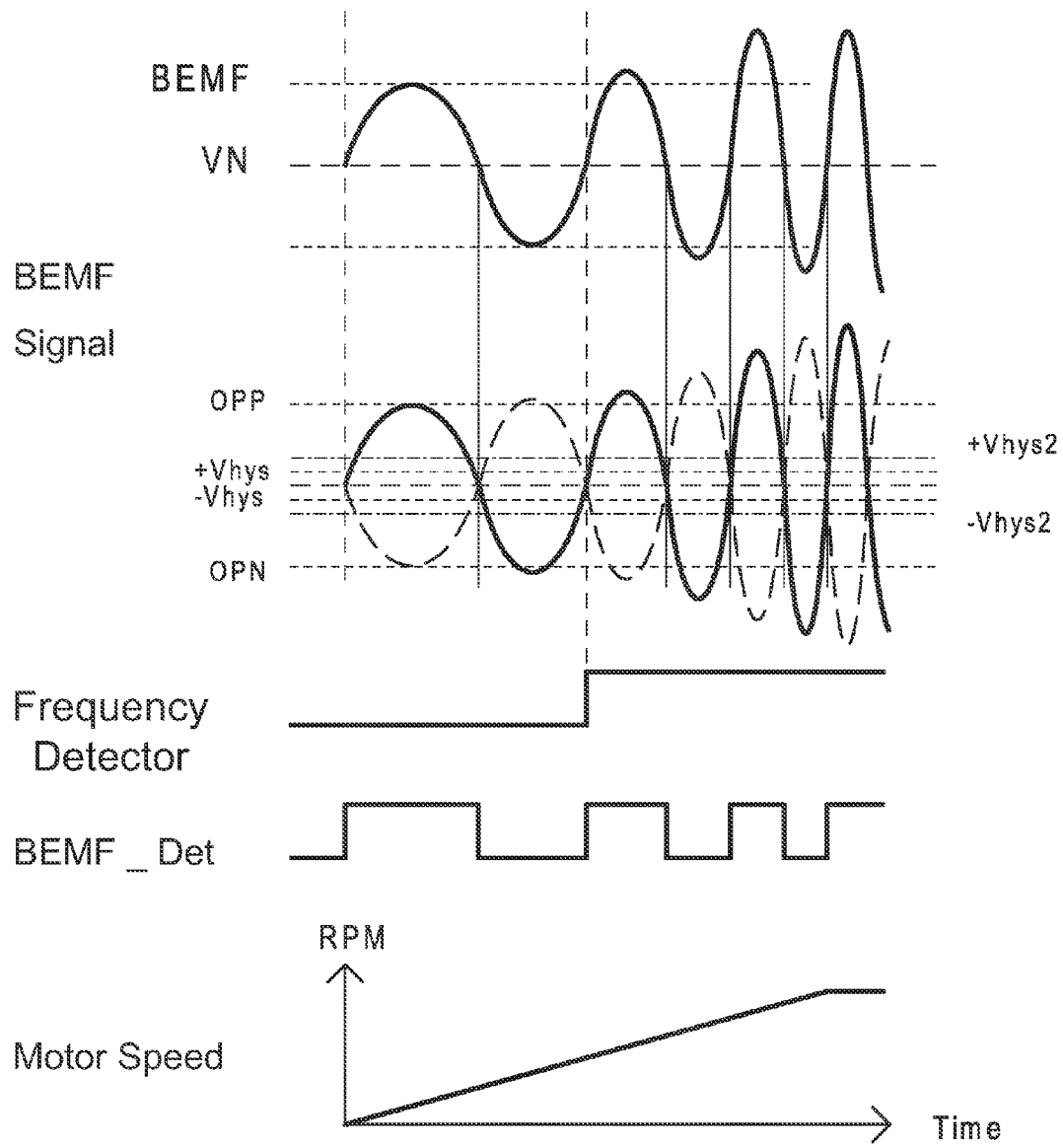
FIG. 6c is a waveform diagram illustrating the BEMF detector sampling level in another embodiment.
Figure 7:
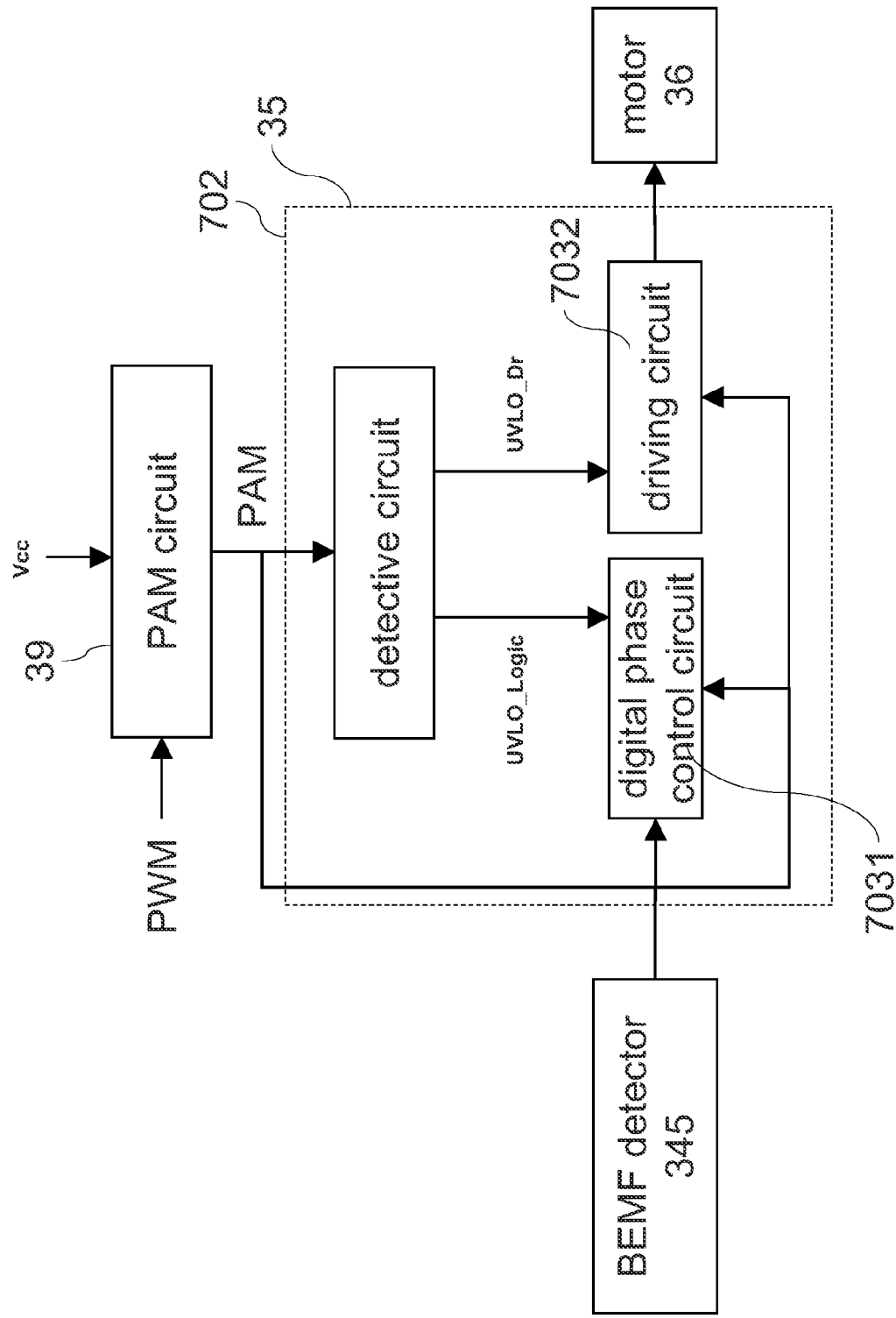
FIG. 7 is a view illustrating a motor driving circuit.

Now, as shown in FIG. 6c, it is a wave diagram illustrating the BEMF amplifier and the hysteresis comparator in another embodiment. As shown in FIG. 7B, when the motor is in the first startup mode (the gain control signal outputted by the frequency detector 347 is low voltage), the BEMF amplifier 613 will compare the level voltage $V_N$ with the BEMF signal. In FIG. 6c, at the first voltage gain mode, the BEMF signal is larger than the level voltage $V_N$, the sine wave voltage OPP of the BEMF amplifier is in positive voltage sine wave and the sine wave voltage OPN is in negative voltage sine wave. When the second mode is in the startup mode but it is not in the predetermine frequency (2000 rotation or 3000 rotation), the gain control signal of the frequency detector 347 will maintain in the low voltage state. The BEMF amplifier 613 will compare the level voltage $V_N$ with the BEMF signal and output the sine wave voltage OPP and OPN. The sine wave OPP and OPN will input to the hysteresis comparator 614, and the hysteresis comparator 614 will compare the sine wave voltage OPP and OPN with the first hysteresis level (+Vhys). When the sine wave voltage OPP is larger than the first hysteresis level, the BEMF detective signal (BEMF_Detc) outputted by the hysteresis comparator 614 is in the high voltage level. When the sine wave voltage OPP is less than the first hysteresis level, the BEMF detective signal (BEMF_Detc) outputted by the hysteresis comparator 614 is in the low voltage level. The first hysteresis level is configured to resist the low noise when the motor driving system is in low rotation speed. When the external motor 36 is in high rotation speed (ex: 2000 rotation or 3000 rotation), the BEMF signal is increased and the noise is also increased. The system noise generated by the motor driving system is also enhanced. The hysteresis level of the hysteresis comparator 614 of the BEMF detector 345 is switched to the second hysteresis level (+Vhys2) from the first hysteresis level (+Vhys). The BEMF amplifier 613 will output the sine wave voltage OPP and OPN to the hysteresis comparator 614. The hysteresis comparator 614 will compare the sine wave voltage OPP and OPN with the second hysteresis level (+Vhys) and output the BEMF detective signal (BEMF_Detec). When the sine wave voltage OPP is larger than the second hysteresis level, the BEMF detective signal (BEMF_Detc) outputted by the hysteresis comparator 614 is in the high voltage level. When the sine wave voltage OPP is less than the second hysteresis level, the BEMF detective signal (BEMF_Detc) outputted by the hysteresis comparator 614 is in the low voltage level. Therefore, the signal distortion caused by the noise is able to be avoided.

FIG. 7 is a view illustrating the motor driving circuit in the present invention. As shown in FIG. 7, the motor driving device 35 includes a detective circuit 352, a digital phase control circuit 7031 and a driving circuit 7032. The digital phase control circuit 7031 is configured to control the detective device 34. The detective device 34 includes a phase detective circuit 341, a phase rotation circuit 343, a BEMF detector 345 and a frequency detector 347 controlled by the digital phase control circuit 7031. The driving circuit 7032 is configured to drive the external motor 36. The motor driving device 35 is controlled by the external PAM circuit 39. The external PAM circuit 39 is an external circuit and isolated outside of the motor driving device 35 and configured to covert the PWM control signal to the PAM control signal. When the external motor outputs the PWM control signal to the PAM circuit 39, the PAM circuit 39 will cover the PWM control signal to the PAM control signal and output it to the detective circuit 352, the digital phase control circuit 7031 and the driving circuit 7032. The PAM control signal is used to drive the digital phase control circuit 7031 and the driving circuit 7032. When the PAM control signal of the PAM circuit 39 is inputted to the detective circuit 352, the detective circuit 352 will start to detect in accordance with the charging and discharging state of the PAM control signal and output the control signal to the digital phase control circuit 7031. The motor driving system will control the detective device 34 by the digital phase control circuit 7031 and output signal to the driving circuit 7032 to drive the external motor 36. Moreover, the detective circuit 352 will control the digital phase control circuit 7031 and the driving circuit 7032 in accordance with the charging and discharging voltage of the PAM control signal. Therefore, when driving the external motor 36, the power is saving.

Figure 8:
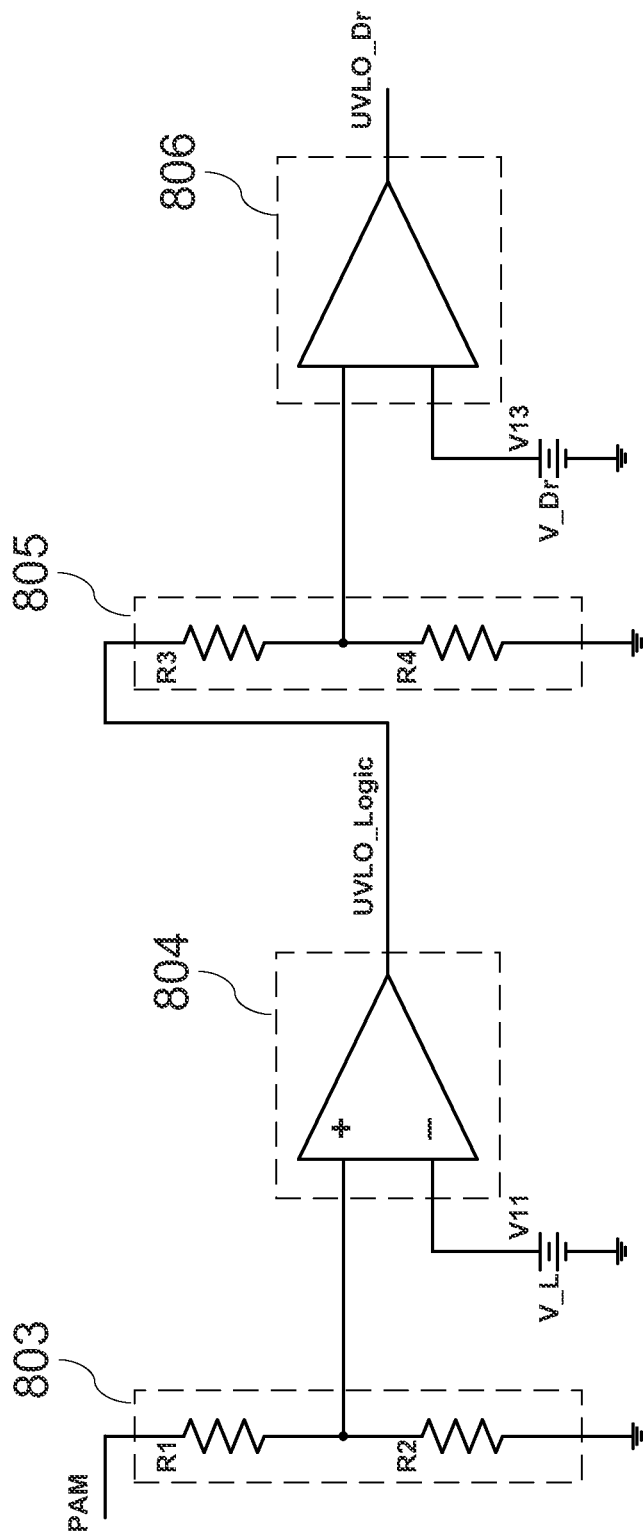
FIG. 8 is a view illustrating a detective circuit of the motor driving circuit.

Now, please referring to FIG. 8, it is a view illustrating the detective circuit of the PAM circuit. As the description above, when the PWM control signal of the external motor driving system is inputted to the PAM circuit 39 and converted to the PAM control signal. The PAM control signal is inputted to the detective circuit 352 of the motor driving device 35 (as shown in FIG. 7). When the PAM control signal is inputted to the detective circuit, the PAM control signal would pass through the first voltage resistor R1 and the second voltage resistor R2 of the first voltage device 803. Therefore, a first compared voltage V_cp1 is generated at the second voltage resistor R2. The first compared voltage V_cp1 and the first level voltage $V_{\_L}$ are inputted to the first comparator 804 to compare and the first comparator 803 will generate a first signal UVLO_Logic. The first signal UVLO_Logic is configured to maintain the digital phase control circuit 7031 in operation mode (ON mode) and the first level voltage $V_{\_L}$ is a low level voltage about 1.6 volts.

Subsequently, the first signal UVLO_Logic will input to the third voltage resistor R3 and the forth voltage resistor R4 of the second voltage device 805 at the next level and a second compared voltage V_cp2 is generated at the forth voltage resistor R4. The second compared voltage V_cp2 and the second level voltage V_Dr are inputted to the second comparator 806 to compare and the second comparator 806 will generate a second signal UVLO_Dr. The second signal UVLO_Dr is configured to maintain the driving circuit 7032 in operation mode (ON mode) or switching to the shutdown mode (OFF mode) and the second level voltage V_Dr is a low level voltage about 1.7 volts.

Please referring to FIG. 8, when the PAM control signal is charged and passed through the first voltage resistor R1 and the second resistor R2 of the first voltage device 803 and the first compared voltage Vcp1 generated at the second voltage resistor R2 is larger than the first level voltage V_L, the first comparator 804 will output the first signal UVLO_Logic. Because the first signal UVLO_Logic is generated in accordance with the compared value generated by comparing the first compared voltage Vcp1 and the first level voltage $V_{-L}$ inputted to the first comparator 804, the first signal UVLO_Logic will be changed in accordance with the charging and discharging period of the PAM control signal. At this moment, the digital phase control circuit 7031 will keep working and the driving circuit 7032 will keep outputting power. When the PAM control signal is in discharging state, the first signal UVLO_Logic generated by the first comparator 804 is in high voltage level. The first signal UVLO_Logic will transmit to the third voltage resistor R3 and the forth voltage resistor R4 of the second voltage device 805 and the second compared voltage UVLO_Dr is generated at the forth voltage resistor R4. Obviously, the second compared signal UVLO_Dr is in high voltage level (the second compared voltage V_cp2 is larger than 1.7V), the power is kept outputting to force the motor rotating. When the PAM control is discharged till the second level voltage V_Dr, the first signal UVLO_Logic is also decreased. Then the first signal UVLO_Logic is transmitted to the second voltage device 805 and the second compared voltage V_cp2 is less than the second level voltage V_Dr, the second signal UVLO_Dr is in low voltage level. The driving circuit 7032 will stop outputting power. In the present embodiment, the first comparator 804 is still in the operation mode, and the discharging speed of the PAM control signal of the PAM circuit 39 will become slower and the period of time of the second signal UVLO_Dr is become longer (the driving circuit 7032 won't output power) until the PWM control signal is back to high voltage level (the PAM control signal is back to charging mode). The second signal UVLO_Dr is changed to be high voltage level and the output power is able to force the motor rotating. Obviously, in the present embodiment, the driving circuit 7032 and the digital phase control circuit 7032 are separated and the circuit is properly designed (such as the voltage resistor in the voltage device), the output state of the driving circuit is changed to be the low voltage level when the second signal UVLO_Dr is discharged to be the second low voltage VrL. The output state of the driving circuit 7032 will change again to be high voltage level when the PAM control signal is charged to be high level voltage. Therefore, the motor is power saving and fast activating.

FIG. 9 is a view illustrating the signal at each end in FIG. 8. As shown in FIG. 9, it is a view of the waveform of the PWM control signal. As the description related to FIG. 8, when the PWD control is in low voltage level, the PAM control signal outputted from the PAM circuit 39 is in discharging state till the PAM control signal is in the second low voltage V_DrL.

Because the first signal UVLO_Logic is direct ratio to the compared difference of the first compared voltage Vcp1 and the first level voltage $V_{-L}$ and the PAM control signal is in the second low voltage V_DrL, the first signal UVLO_Logic will also decrease to force the second signal UVLO_Dr changing to be low voltage level and no power is outputted from the driving circuit 7032. Because the first first comparator is always in the operation mode, the discharging slope of the PAM circuit 39 (as shown the a section in FIG. 9) is slow and larger than the first lowest voltage level $V_{LL}$, the first compared voltage Vcp1 generated by PAM control signal voltage dividing in the first voltage device 803 is still larger than the first voltage level V_L. Therefore, the first comparator 804 is also able to output a smaller voltage signal (the first signal UVLO_Logic) to the input end of the second comparator 806. For example, when the discharging speed of the PAM control signal is become slower and smaller than the second lowest voltage level V_DrL and the PAM control signal is inputted to the first voltage device 803, the first compared voltage of the first voltage device 803 is still larger than the first voltage level V_L and the first signal UVLO_Logic is maintained in the certain voltage level. The first signal UVLO_Logic will input to the second voltage device 805 and the second voltage device 805 will generate a second compared voltage Vcp2. Because the first signal UVLO_Logic voltage value is decreased by decreasing the PAM signal voltage, the second compared voltage Vcp2 generated by the first signal UVLO_Logic at the second voltage device 805 is smaller than the second level voltage V_Dr and the second signal is switched to the low voltage level. When the next charging and discharging period is begun and the PWM control signal is back to high voltage level, the PAM control is in charging state. When the PAM control signal voltage is more than the third lowest level voltage VDrL, the PAM control signal is inputted to the first voltage device 803, the first voltage device 803 will generate the first compared voltage Vcp1 and the first compared voltage Vcp1 is inputted to the first comparator 804. The first signal UVLO_Logic of the first comparator 804 is maintained at the certain voltage level and the first signal UVLO_Logic is inputted to the second voltage device 805 and the second voltage device 805 will generate a second compared voltage Vcp2. Because the first signal UVLO_Logic voltage will be increased by increasing the PAM control signal voltage, the second compared voltage Vcp2 generated by first signal UVLO_Logic is larger than the second level voltage V_Dr, the second reset signal UVLO_Dr is switched to high voltage level an the driving circuit 7032 of the motor driving device 35 is back to normal operation. Obviously, in the present embodiment, the second level voltage V_Rr must be higher than the second lowest voltage VrL. Because the second signal UVLO_Dr is changed from low voltage level to high voltage level, the second comparator 806 is required to include more input driving voltage and the PAM control signal is also increased to the second level voltage V_Dr, the second comparator 806 is able to force the driving circuit to work in the normal operation mode. Because the first comparator 804 of the driving circuit 7032 of the motor driving device 35 is always working in the normal operation mode, the startup time of the motor driving device is reduced and the discharging speed of the PAM circuit is slow down to achieve the power saving.

What is claimed is:

1. A driving device in a direct current (DC) brushless motor system comprising:
  a pulse amplitude modulation (PAM) circuit including an input end is connected to a pulse width modulation (PWM) and outputting a PAM signal;

a detective circuit including a first comparator and a second comparator, and a first input end of the first comparator is connected to a first voltage circuit and a second input end is connected to a first level voltage and outputs a first signal, and a first input of the second comparator is connected to a second voltage circuit and a second input is connected to a second level voltage and outputs a second signal, wherein an input end of the first voltage circuit is connected to the PAM control signal and an input end of the second voltage circuit is connected to the first signal;

a driving circuit, and one input end of the driving circuit is connected to the PAM circuit, another input end is connected to the second signal of the detective circuit and an output end is connected to the external motor; and a digital phase control circuit, and one input end of the digital phase control circuit is connected to the PAM circuit, another input end is connected to the first signal of the detective circuit and an output end is connected to the driving circuit.

2. The driving device according to claim 1, wherein the second level voltage value is larger than the first level voltage value.

3. The driving device according to claim 1, wherein the first comparator is in an operation mode to output the first signal.

4. A direct current (DC) brushless motor system, comprising:

a control device, and one end of the control device is connected to an oscillation device;

a switching device, and one end of the switching device is connected to the other end of the control device;

a startup device, and one end of the startup device is connected to the other end of the switching device;

a detective device, and one end of the detective device is connected to the other end of the startup device;

a driving device and one end of the driving device is connected to the other end of the detective device and the other end is connected to an external motor; and feedbacks to the other end of the detective device from a three-phase coil of the external motor; and a phase lock loop frequency device connected to the detective device, wherein the driving device includes:

a pulse amplitude modulation (PAM) circuit including an input end is connected to the detective device;

a detective circuit, one input thereof is connected to the PAM circuit;

a driving circuit, and one input end of the driving circuit is connected to the PAM circuit, one another input end is connected to the output end of the detective circuit and an output end is connected to the external motor; and a digital phase control circuit, and one input end of the digital phase control circuit is connected to the PAM circuit, one another input end is connected to the another output end of the detective circuit and an output end is connected to the driving circuit.

5. The DC brushless motor system according to claim 4, wherein the detective circuit including a first comparator and a second comparator, and a first input end of the first comparator is connected to a first voltage circuit and a second input end is connected to a first level voltage and outputs a first signal, and a first input of the second comparator is connected to a second voltage circuit and a second input is connected to a second level voltage and outputs a second signal, wherein an input end of the first voltage circuit is connected to the PAM control signal and an input end of the second voltage circuit is connected to the first signal.

6. The DC brushless motor system according to claim 5, wherein the second level voltage value is larger than the first level voltage value.

7. The DC brushless motor system according to claim 5, wherein the first comparator is always in an operation mode to output the first signal.

8. The DC brushless motor system according to claim 4, wherein the detective device includes:

a phase detective circuit, and one end of the phase detective device is connected to the startup device and the other end is connected to the frequency detector and the phase lock loop frequency device;

a phase rotation circuit, and one end of the phase rotation circuit is connected to the other end of the phase detective circuit and the other end is connected to one end of the driving circuit;

a BEMF detector, and one end of the BEMF detector is connected to the feedback of the three-phase coil of the external motor and the other end is connected to the phase detective circuit; and a frequency detector, and one end of the frequency detector is connected to the phase detective circuit and the phase lock loop frequency device and the other end is connected to the BEMF detector; wherein the BEMF detector includes:

a BEMF detective switch, and one of the BEMF detective switch is connected to the feedback of the three-phase coil of the external motor;

a BEMF sample amplifier, wherein a first input end is connected to an output end of the BEMF switch, a second input end is connected to a level voltage of the three-phase coil, and a third input end is connected to the frequency detector and outputs a positive voltage sine wave and a negative voltage sine wave; and a hysteresis comparator including a first hysteresis level, and an input end is connected to the positive voltage sine wave and the negative voltage sine wave and the other end is connected to the frequency detector and outputs a BEMF detective signal to the phase detective circuit.

9. The DC brushless motor system according to claim 8, wherein normal voltage mode and the voltage suppressing mode are switched in accordance with a control signal of the frequency detector.

10. The DC brushless motor system according to claim 9, wherein the first hysteresis and the second hysteresis are switched in accordance with the control signal of the frequency detector.

11. The DC brushless motor system according to claim 4, wherein the startup device is made by a startup circuit and a normal rotation circuit.

12. The DC brushless motor system according to claim 4, when the DC brushless motor system has been activated, the rotation speed of the DC brushless motor system is sequentially achieved in a first predetermined startup rotation speed and a second predetermined startup rotation speed with different frequency.

13. The DC brushless motor system according to claim 12, wherein the second predetermined startup rotation speed is integral multiple of the first predetermined rotation speed.

* * * * *